(12) United States Patent
Cioc et al.

(10) Patent No.: US 10,451,121 B2
(45) Date of Patent: Oct. 22, 2019

(54) ELECTRONICALLY-CONTROLLED SELECTABLE CLUTCH WITH ACTIVE STRUT MODULE AND METHODS OF ASSEMBLY AND SETTING A MAGNETIC GAP THEREOF

(71) Applicant: Magna Powertrain, Inc., Concord (CA)

(72) Inventors: Adrian C. Cioc, Richmond Hills (CA); Darrell F. Greene, Bradford (CA); David V. Dorigo, Concord (CA); Sean A. Steele, Mississauga (CA); Myron R. Samila, Toronto (CA); Dennis T. Loui, Richmond Hill (CA)

(73) Assignee: Magna Powertrain, Inc., Concord (CA)

( * ) Notice: Subject to any disclaimer, the term of this patent is extended or adjusted under 35 U.S.C. 154(b) by 177 days.

(21) Appl. No.: 15/564,068

(22) PCT Filed: Apr. 25, 2016

(86) PCT No.: PCT/IB2016/000628
§ 371 (c)(1),
(2) Date: Oct. 3, 2017

(87) PCT Pub. No.: WO2016/170428
PCT Pub. Date: Oct. 27, 2016

(65) Prior Publication Data
US 2018/0094677 A1    Apr. 5, 2018

Related U.S. Application Data

(60) Provisional application No. 62/152,137, filed on Apr. 24, 2015, provisional application No. 62/270,212, filed on Dec. 21, 2015.

(51) Int. Cl.
*F16D 41/12* (2006.01)
*F16D 27/00* (2006.01)
(Continued)

(52) U.S. Cl.
CPC ............ *F16D 41/14* (2013.01); *F16D 27/118* (2013.01); *F16D 41/16* (2013.01); *F16D 27/10* (2013.01);
(Continued)

(58) Field of Classification Search
CPC ........ F16D 41/14; F16D 41/16; F16D 27/108; F16D 27/06; F16D 27/118;
(Continued)

(56) References Cited

U.S. PATENT DOCUMENTS

| 3,194,369 A | 7/1965 | White | |
|---|---|---|---|
| 7,500,548 B2 * | 3/2009 | Kimes | ..................... F16D 41/12 192/46 |

(Continued)

FOREIGN PATENT DOCUMENTS

| CN | 1748094 A | 3/2006 |
|---|---|---|
| CN | 101210594 A | 7/2008 |

(Continued)

OTHER PUBLICATIONS

International Search Report and Written Opinion dated Sep. 12, 2016 from International Patent Application Serial No. PCT/IB2016/000628.

(Continued)

*Primary Examiner* — Jacob S. Scott
*Assistant Examiner* — Lillian T Nguyen
(74) *Attorney, Agent, or Firm* — Dickinson Wright PLLC

(57) ABSTRACT

A bi-directional clutch assembly, method of construction thereof and method of setting a preset gap between a magnetically permeable core and armature thereof is pro-
(Continued)

vided, An outer race has inner ratchet teeth and an inner race has outer ratchet teeth. A passive one-way clutch has passive struts pivotally supported for locked engagement with the inner ratchet teeth in a first direction. A selectable one-way clutch has an active strut selectively pivotal from an unlocked position to a locked position for engaging the outer ratchet teeth during rotation of the inner race in a second direction opposite the first direction. A protrusion extends radially outwardly from the outer race and has an orifice extending therethrough. A coil is operably supported by the protrusion. The magnetically permeable core is operably fixed in the orifice to be magnetized by the coil to move the at least one active strut to the locked position.

19 Claims, 9 Drawing Sheets

(51) Int. Cl.
*F16D 41/16* (2006.01)
*F16D 41/14* (2006.01)
*F16D 27/118* (2006.01)
*F16D 27/10* (2006.01)
*F16D 41/04* (2006.01)

(52) U.S. Cl.
CPC ........ *F16D 41/04* (2013.01); *F16D 2027/001* (2013.01)

(58) Field of Classification Search
CPC .... F16D 2027/001; F16D 41/04; F16D 27/10; F16D 41/12; F16D 41/125
See application file for complete search history.

(56) References Cited

U.S. PATENT DOCUMENTS

| | | | |
|---|---|---|---|
| 2009/0194381 A1* | 8/2009 | Samie | B60K 6/383 192/43.2 |
| 2013/0319812 A1 | 12/2013 | Wys et al. | |
| 2014/0102844 A1* | 4/2014 | Greene | F16D 41/12 192/45.1 |

FOREIGN PATENT DOCUMENTS

| | | |
|---|---|---|
| CN | 201461803 U | 5/2010 |
| CN | 101764463 A | 6/2010 |
| CN | 103591180 A | 2/2014 |
| CN | 103765028 A | 4/2014 |
| CN | 103807319 A | 5/2014 |
| WO | WO9842996 A1 | 10/1998 |
| WO | WO2009100094 A2 | 8/2009 |
| WO | WO2009100094 A3 | 10/2009 |
| WO | WO2015013802 A1 | 2/2015 |
| WO | WO2015030983 A1 | 3/2015 |
| WO | WO2015127546 A1 | 9/2015 |

OTHER PUBLICATIONS

Search Report dated Nov. 22, 2018 from corresponding Chinese Patent Application No. 201680031938.7.
Search Report dated Dec. 14, 2018 from corresponding Chinese Patent Application No. 201680031862.8.
Search Report dated Dec. 17, 2018 from corresponding Chinese Patent Application No. 201680035368.9.

* cited by examiner

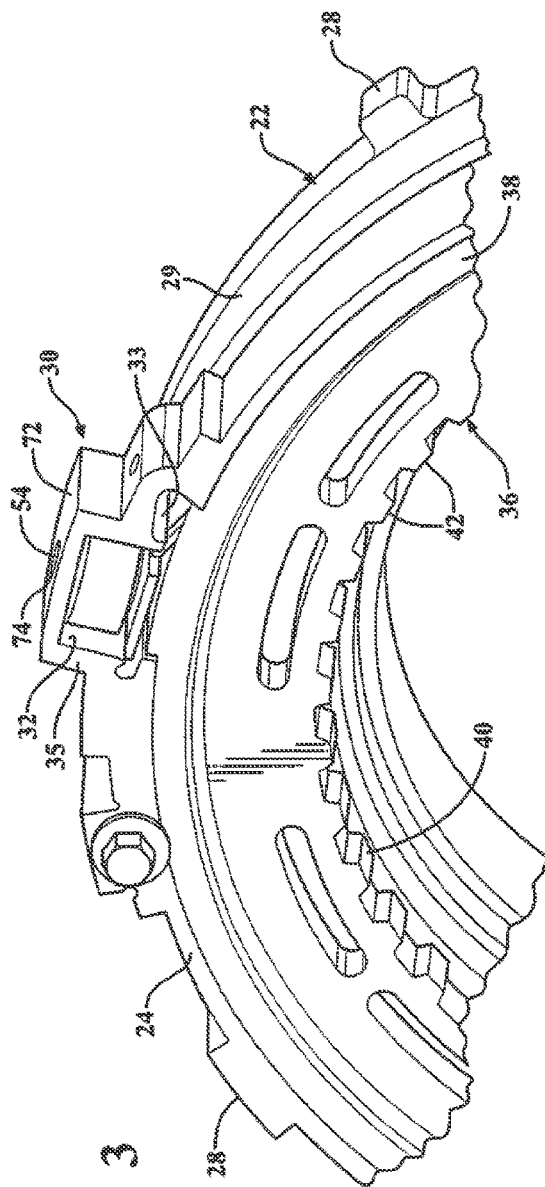
FIG. 3
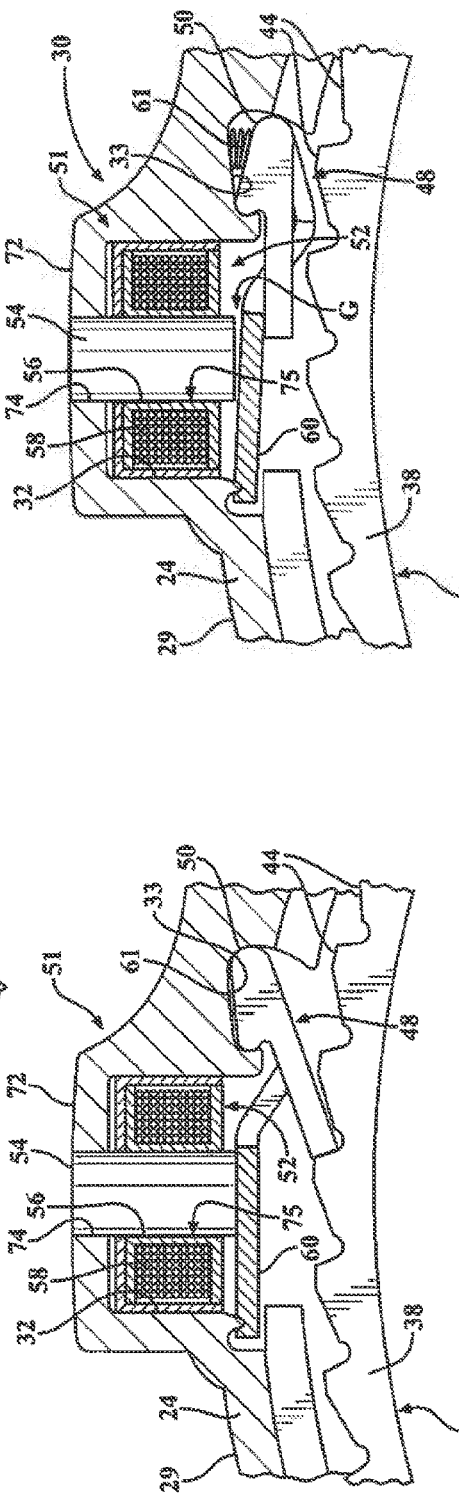
FIG. 3A
FIG. 3B

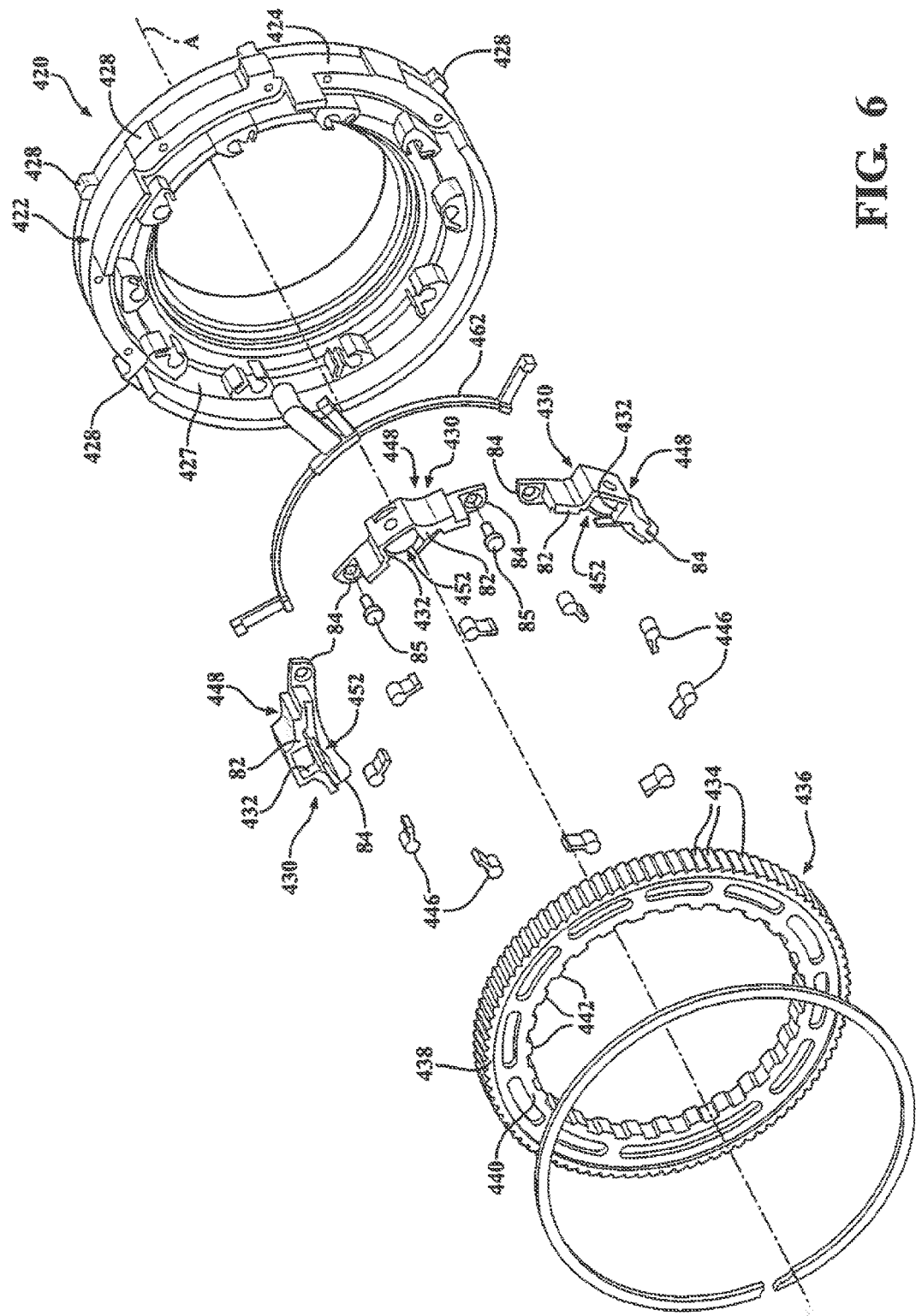

ELECTRONICALLY-CONTROLLED SELECTABLE CLUTCH WITH ACTIVE STRUT MODULE AND METHODS OF ASSEMBLY AND SETTING A MAGNETIC GAP THEREOF

CROSS-REFERENCE TO RELATED APPLICATIONS

This application is a National Stage of International Application No. PCT/IB2016/000628, filed Apr. 25, 2016, which claims the benefit of U.S. Provisional Application No. 62/152,137, filed Apr. 24, 2015, and U.S. Provisional Application No. 62/270,212, filed Dec. 21, 2015. The entire disclosures of each of the above applications are incorporated herein by reference in their entirety.

FIELD OF THE INVENTION

The present disclosure is generally related to overrunning coupling devices such as one-way clutches or brakes and, more specifically to selectable one-way coupling (SOWC) devices having an electromagnetic actuator assembly.

BACKGROUND OF THE INVENTION

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in automatic transmission is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Such conventional one-way clutches provide no independent control over their modes of operation, that is to say whether they lockup or freewheel in both directions and are commonly referred to as passive one-way clutches. Thus, basic one-way clutches provide a "locked" mode in one rotary direction and a "freewheel" mode in the opposite direction based on the direction that the drive torque is being applied to the input race or drive plate.

There are however, requirements in modern automatic transmissions where a "controllable" overrunning coupling device, commonly referred to as a selectable one-way clutch (SOWC), can be selectively controlled to provide additional functional modes of operation. Specifically, a selectable one-way clutch may further be capable of providing a freewheel mode in both rotary directions until a command signal (i.e., from the transmission controller) causes a power-operated actuator to shift the coupling device into its lockup mode. Thus, a selectable one-way clutch may be capable of providing a drive connection between an input member and an output member in one or both rotational directions and it may also be operable to freewheel in one or both directions. It is also known in modern automatic transmissions to integrate a passive one-way clutch and a selectable one-way clutch into a combined coupling device, commonly referred to as a bi-directional clutch.

A need exists to continue development of new and improved overrunning coupling devices that advance the art and provide enhanced functionality.

SUMMARY

In accordance with one aspect of the invention, a bi-directional clutch assembly is provided. The assembly includes an outer housing presenting an outer race having a plurality of inner ratchet teeth and an inner race presenting a plurality of outer ratchet teeth. The assembly further includes a passive one-way clutch including a plurality of passive struts pivotally supported for locked engagement with the inner ratchet teeth during rotation of the inner race in a first direction relative to the outer race. Further yet, the assembly includes a selectable one-way clutch including at least one active strut selectively pivotal from an unlocked position, wherein the active strut is disengaged from the outer ratchet teeth, to a locked position for engaging one of the plurality of outer ratchet teeth during rotation of the inner race in a second direction opposite the first direction. A protrusion extends radially outwardly from the outer housing, wherein the protrusion has an outer wall with an orifice extending therethrough. A coil assembly having a bobbin, a coil wrapped about the bobbin, and an elongate core extending through a through passage of the bobbin is operably supported by the protrusion. The elongate core is operably fixed in the orifice, to be selectively magnetized by the coil, to move the at least one active strut to the locked position, and to be selectively demagnetized, to allow the at least one active strut to return to the unlocked position.

In accordance with another aspect of the invention the elongate core can press fit in the orifice, thereby simplifying assembly.

In accordance with another aspect of the elongate core can be provided to extend through the through passage of the bobbin in a clearance fit, thereby further simplifying assembly and service.

In accordance with another aspect of the invention the protrusion can fixed to the outer race as a separate piece of material.

In accordance with another aspect of the invention the elongate core can press fit in the through passage of the bobbin to facilitate maintaining components in place upon assembly and during use with need for further fastening mechanisms.

In accordance with another aspect of the invention the bobbin and coil can be provided to extend radially outwardly from the protrusion to facilitate modular assembly and service.

In accordance with another aspect of the invention a nut can be fixed in the orifice and the core can be threaded in fixed relation in the nut to facilitate assembly and establish a precise gap between the armature of the active strut assembly and the core.

In accordance with another aspect of the invention the protrusion can be provided having an actuator pocket facing radially inwardly from the outer wall and the coil assembly can be readily disposed in the actuator pocket to facilitate assembly.

In accordance with another aspect of the invention the actuator pocket can be provided having an open side surface to facilitate disposing the coil assembly axially into said actuator pocket.

In accordance with another aspect of the invention the bobbin can be press fit into the actuator pocket to facilitate assembly.

In accordance with another aspect of the invention, a method of constructing a bi-directional clutch assembly is provided. The method includes providing an outer race presenting a plurality of inner ratchet teeth; providing an inner race presenting a plurality of outer ratchet teeth; supporting a plurality of passive struts on the inner race for pivotal movement into locked engagement with the inner ratchet teeth during rotation of the inner race in a first direction relative to the outer race; supporting at least one active strut on the outer race for pivotal movement from an unlocked position wherein the active strut is disengaged from the outer ratchet teeth to a locked position for engaging one of the plurality of outer ratchet teeth during rotation of the inner race in a second direction opposite the first direction; providing a protrusion extending radially outwardly from the outer housing, wherein the protrusion has an outer wall with an orifice extending therethrough; providing a coil assembly having a bobbin, a coil wrapped about the bobbin, and an elongate core extending through a through passage of the bobbin; disposing an armature between the active strut and the core and configuring the armature for pivotal movement in response to the core being magnetized to pivot the active strut into the locked position; and operably fixing the elongate core in the orifice and establishing a preset gap between a free end of the core and the armature when the core is selectively demagnetized.

In accordance with another aspect of the invention the method can further include press fitting the elongate core into the orifice.

In accordance with another aspect of the invention the method can further include fixing the protrusion to the outer race as a separate piece of material from the outer race to facilitate modular construction.

In accordance with another aspect of the invention the method can further include press fitting the elongate core in the through passage of the bobbin.

In accordance with another aspect of the invention the method can further include fixing a nut in the orifice and threading the core in fixed relation into the nut.

In accordance with another aspect of the invention the method can further include extending the elongate core through the through passage of the bobbin in a clearance fit.

In accordance with another aspect of the invention the method can further include fixing the bobbin and the coil radially outwardly from the protrusion.

In accordance with another aspect of the invention the method can further include providing the protrusion with an actuator pocket facing radially inwardly from the outer wall and disposing the bobbin and coil into the actuator pocket.

In accordance with another aspect of the invention the method can further include disposing the bobbin and coil axially into the actuator pocket through an open side surface of the pocket.

In accordance with another aspect of the invention the method can further include press fitting the bobbin and coil into the actuator pocket.

In accordance with another aspect of the invention the method, a method of establishing a preset gap between a core of a coil assembly and an armature of a bi-directional clutch assembly while the core is in a de-energized state is provided. The method includes disposing the core radially through an orifice of a protrusion containing the armature and forming the gap between a free end of the core and a surface of the armature.

In accordance with another aspect of the invention the method can further include press fitting the core into the orifice while disposing the core radially therein.

In accordance with another aspect of the invention the method can further include threading the core into a nut fixed in the orifice.

In accordance with another aspect of the invention the method can further include threading the core into abutment with the armature and then backing the core radially outwardly by reverse threading the core a predetermined distance.

These and other features and advantages of the present invention will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 3 is an assembled partial perspective view of the clutch assembly of FIG. 1 showing an arrangement for installing the electromagnetic actuator in an axially directed configuration;

FIGS. 3A and 3B are cross-sectional side views of the electromagnetic actuator of FIG. 3 with a strut of an active strut assembly shown in locked and unlocked positions, respectively, in response to respective energized and de-energized states of the electromagnetic actuator;

FIG. 6 is an exploded perspective view of a bi-directional clutch assembly configured to include a modular active strut arrangement for a selectable one-way clutch in accordance with another aspect of the present disclosure;

DESCRIPTION OF THE ENABLING EMBODIMENTS

Figure 1:
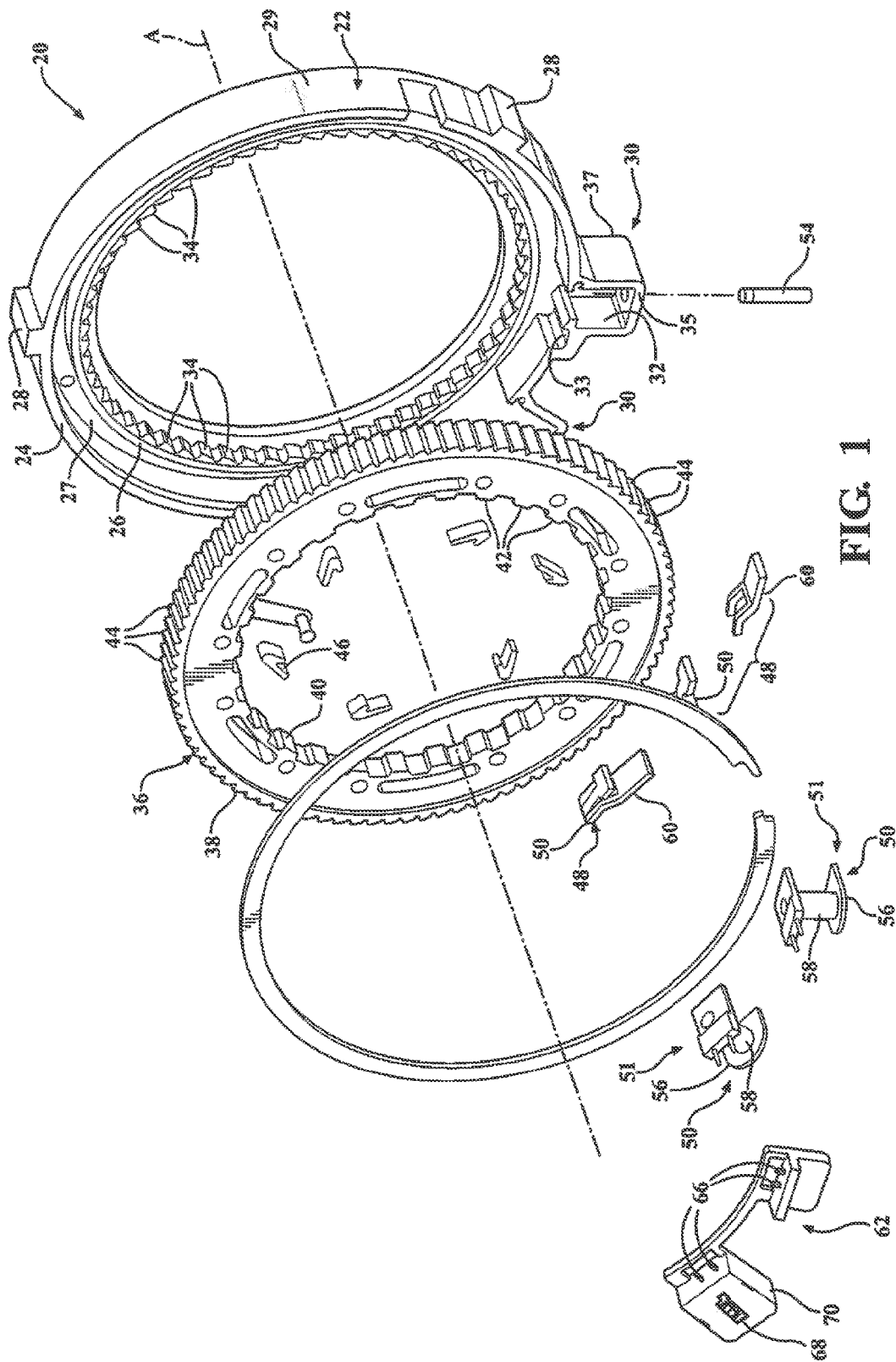
FIG. 1 is an exploded perspective view of a bi-directional clutch assembly configured to include a passive one-way clutch and a selectable one-way clutch having an electromagnetic actuator and a lead frame and integrated safety switch in accordance with an aspect of the disclosure.

Example embodiments will now be described more fully with reference to the accompanying drawings. In general, each embodiment is directed to an overrunning coupling device (i.e. brake and/or clutch) having at least a controllable one-way locking device including a moveable locking component (i.e. spray, strut, etc.) that is controlled, at least in part, via an electromagnetic actuator. Thus, the overrunning coupling device transmits torque mechanically but is actuated via an electrical actuation system. It is to be recognized the example embodiments only are provided so that this disclosure will be thorough, and will fully convey the scope, which is ultimately defined by the claims, to those who are skilled in the art. Numerous specific details are set forth, such as examples of specific components, devices, and methods, to provide a thorough understanding of embodiments of the present disclosure. It will be apparent to those skilled in the art that certain specific details need not be employed, that example embodiments may be embodied in many different forms, and that neither should be construed to limit the scope of the disclosure or the claims. In some example embodiments, well-understood processes, well-understood device structures, and well-understood technologies are not described in detail.

Referring to FIGS. 1, 3 and 3A-3B, wherein like numerals indicate corresponding parts throughout the several views, unless otherwise stated, a bi-directional clutch assembly 20 is generally shown. As will be detailed in further detail below, bi-directional clutch assembly 20 generally includes a stationary outer race, a rotatable inner race, a passive one-way clutch having a plurality of passive struts, and a selectable one-way clutch having at least one active strut assembly and a respective electromagnetic actuator 51 associated with each active strut assembly. The clutch assembly 20 includes an outer housing presenting an outer race 22 that extends annularly about an axis A. It should be recognized the outer housing/outer race 22 can be constructed as a single piece of material or as separate pieces of material and subsequently fixed to one another, as will be appreciated by one skilled in the art. The outer race 22 includes an outer ring segment 24 and an inner ring segment 26 that are spaced radially from one another and interconnected via a radial web segment 27. The outer ring segment 24 presents a plurality of outer lugs 28 that extend radially outwardly from an outer surface 29 of the outer ring segment 24 for mating with a first component. The first component can be a stationary component (such as a housing of a transmission) or a rotary component (such as a shaft). The outer ring segment 24 further presents at least one, and shown as a pair of coil assembly support protrusions, referred to hereafter simply as protrusions 30, that extend radially outwardly from the outer surface 29 of the outer ring segment 24. Each of the protrusions 30 forms a radially extending actuator pocket 32 and a strut pocket 33. The respective pockets 32, 33 are shown as being open along one side surface 35, and closed along an opposite side surface 37 by a wall of the protrusion 30. It should be appreciated that more or fewer protrusions 30 could be provided by the outer ring segment 24. The inner ring segment 26 presents a plurality of inner ramp surfaces, hereinafter referred to as inner ratchet teeth 34, that extend radially inwardly and are evenly distributed about the axis A.

The clutch assembly 20 further includes an annular inner race 36 that also extends annularly about the axis A. The inner race 36 has an outer rim 38 and an inner rim 40 that are spaced radially from one another by a radial web segment 41. Upon assembly, the outer rim 38 is disposed radially between the outer and inner ring segments 24, 26 of the outer race 22, and the inner rim 40 is disposed radially inwardly from the inner ring segment 26 of the outer race 22. The inner rim 40 of the inner race 36 presents a plurality of inner lugs 42 that extend radially inwardly for mating with a second component (typically a rotary component). Commonly, lugs 42 interconnect a shaft or clutch plates for conjoint rotation with inner race 36. Further, the outer rim 38 of the inner race 36 presents a plurality of outer ramp surfaces, hereinafter referred to as outer ratchet teeth 44, that extend radially outwardly and are evenly distributed about the axis A.

The passive one-way clutch includes a plurality of locking elements, also referred to as passive struts 46, which are pivotally supported in strut apertures formed in the inner race 36 for pivoting between a locking position and an unlocking position. In the locking position, the passive struts 46 engage the inner ratchet teeth 34 of the outer race 22 for connecting the outer and inner races 22, 36 to one another during counter-clockwise rotation of the inner race 36 relative to the outer race 22. Therefore, engagement by one or more of the passive struts 46 prevents relative displacement of the outer and inner races 22, 36 in the counter-clockwise direction. However, the passive struts 46 still allow relative displacement between the outer and inner races 22, 36, i.e., overrun, in the clockwise direction when located in the locked position since they ratchet over the ramped profile of the inner ratchet teeth 34. In the unlocked position, the passive struts 46 are radially spaced from the inner ratchet teeth 34 of the outer race 22, therefore also allowing counter-clockwise rotation of the inner race 36 relative to the outer race 22.

In association with the selectable one-way clutch, an active strut assembly 48, a portion of which is received by each of the strut pockets 33 of the outer ring segment 24. Each of the active strut assemblies 48 includes an active strut 50 that is selectively pivotal between a locked and an unlocked position. In the locked position (FIG. 3A), the active strut 50 lockingly engages the outer ratchet teeth 44 of the inner race 36, thereby locking the outer and inner races 22, 36 to one another during clockwise movement of the inner race 36 relative to the outer race 22. However, the active strut 50 still allows relative displacement between the outer and inner races 22, 36, i.e., overrun, in the counter-clockwise direction. In the unlocked position (FIG. 3B), the active strut 50 is radially spaced from the outer ratchet teeth 44, allowing the inner and outer races 22, 36 to rotate relative to one another. Furthermore, each of the active strut assemblies 48 includes an armature 60 that is disposed adjacent to, and in operable communication with, the active strut 50 for providing the selective pivotal movement of the active strut 50.

The selectable one-way clutch also includes the electromagnetic actuator 51, which is associated in operable communication with each active strut 50. Each electromagnetic actuator 51 includes a coil assembly 52. The coil assembly 52 can be mounted in the actuator pocket 32 and is radially spaced from the active strut 50 and armature 60. The coil assembly 52 includes an elongate core 54 of a paramagnetic or ferromagnetic, magnetically permeable material, shown by way of example and without limitation as being generally cylindrical, a bobbin 56 disposed about the core 54, and at least one coil 58 spirally wrapped about the bobbin 56. Furthermore, the armature 60 is disposed between the active strut 50 and the core 54/coil 58 for pivoting movement of the armature 60 toward the core 54, as commanded via energization of the coil assembly 52, and thus providing the pivotal movement of the active strut 50 in response to energization of the coil 58 via electric current.

More specifically, when electric voltage and/or current are applied to the coil 58, the coil 58 becomes an electromagnet producing an electric field (or flux). The flux flows outwards in all directions and transfers through the small preset air gap C (FIG. 3B) between the armature 60 and core 54, which extends through a central through passage of the bobbin 56 of the coil assembly 52. The core 54 becomes selectively magnetized by the energized coil 58, thereby attracting and pivoting the magnetically attracted metallic armature 60 towards the core 54. The resulting pivoting motion of the armature 60 forces the active strut 50 to mechanically deploy radially inwardly due to the linkage between the active strut 50 and the armature 60. On deployment, the active strut 50 moves from its unlocked position (FIG. 3B) to its locked position (FIG. 3A) where it locates itself against one of the outer ratchet teeth 44 of the inner race 36, effectively locking the inner race 36 from rotating clockwise relative to the outer race 22. Disengagement occurs as voltage and/or current is removed from the coil assembly 52, wherein the core 54 is selectively and suddenly demagnetized, thus releasing the armature 60 from being magnetically attracted to the core 54 of the coil assembly 52. A biasing spring 61 is positioned within the strut pocket 33 between an end portion of the active strut 50 and the outer race 22, causing the active strut 50 to suddenly pivot back to its unlocked position upon de-energization of the coil assembly 52 and demagnification of the core 54.

It should be appreciated that the arrangement of the armature 60, active strut 50, and coil assembly 52 can act to apply a locking force in a radial direction (as shown in FIG. 1) or an axial direction, depending on the layout and/or requirements of the clutch assembly 20. Radial stacked clutch assembly 20 designs offer packaging advantages over their axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

Figure 2:
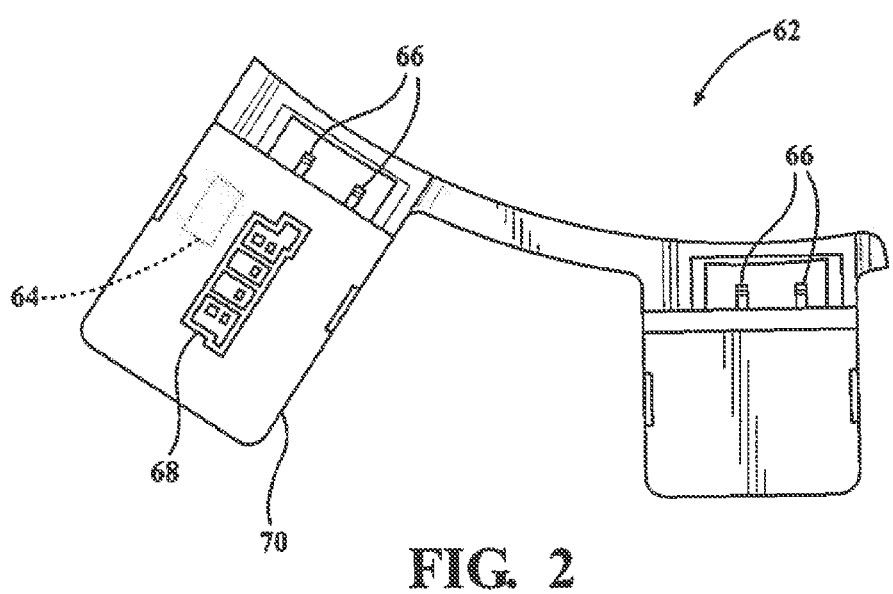
FIG. 2 is a front view of the lead frame and integrated safety switch of FIG. 1.

As shown in FIGS. 1 and 2, a lead frame 62 is attached to each of the electromagnetic actuators 51 for electrically connecting the coils 58 to one another for simultaneously energizing the coils 58. It should be appreciated that the lead frame 62 could connect any number of coils 58. A printed circuit hoard (PCB) 64 is attached to the lead frame 62 for selectively controlling the energization of the coils 58. The PCB 64 is disposed radially and axially adjacent to one of the coils 58. The lead frame 62 further includes at least one power output contact 66 that is disposed radially and axially adjacent to each of the coils 58 for electrically connecting to the coils 58 to provide power to the coils 58. Any number of power contacts 66 could be utilized to power any number of coils 58. Any suitable connection can be utilized to connect the power output contact 66 and the coils 58. Furthermore, at least one wire (not shown) extends between the circuit board 64 and each of the power output contacts 66 for electrically connecting the circuit board 64 and the power output contacts 66. The lead frame 62 also includes connection interface 68 for establishing an electrical connection between the printed circuit board 64 and an external control module, such as a (TCM) or a powertrain control module (PCM) for transmitting data to the PCB 64 and to power the PCB 64. Additionally, the lead frame 62 includes a plastic encapsulation or casing 70 that is disposed about the PCB 64 and the electronics for protecting the PCB 64 and the electronics for allowing the lead frame 62 to be submerged in automatic transmission fluid (ATF) and operate in −40 C to +140 C temperatures. It should be appreciated that the aforementioned configuration of the lead frame 62 and associated components provide a low-cost, modular solution that provides for a more simplified manufacturing process and assembly.

Referring to FIGS. 3, 3A and 3B, in an example embodiment of the protrusions 30, the open side surface 35 defines the actuator pocket 32 for axially receiving the coil assembly 52. Furthermore, a radially outwardly facing outer wall 72 of the protrusion 30 provides a through passage, also referred to simply as orifice 74, that extends radially inwardly into the actuator pocket 32. In this embodiment, coil 58 and bobbin 56 are axially disposed and press fit into the actuator pocket 32 through the open side surface 35. Once in position in the actuator pocket 32, which extends radially inwardly from the outer wall 72, the core 54 is pressed radially inwardly through the orifice 74 and through a central through passage of the bobbin 56 until it reaches a predetermined, preset location which sets the magnetic gap G between an armature 60 and the free end of the core 54. The core 54 attains a press fit against an inner surface 75 that defines and bounds the through passage of the bobbin 56, thereby being fixed against movement therein. The core 54 can further be press fit in the through passage of the bobbin 56, or configured in a clearance fit therein. FIG. 3A shows an active strut 50 in the locked position as a result of energization of the coil assembly 52 and FIG. 3B shows the active strut 50 in the unlocked position as a result of de-energizing the coil assembly 52.

Figure 4A:
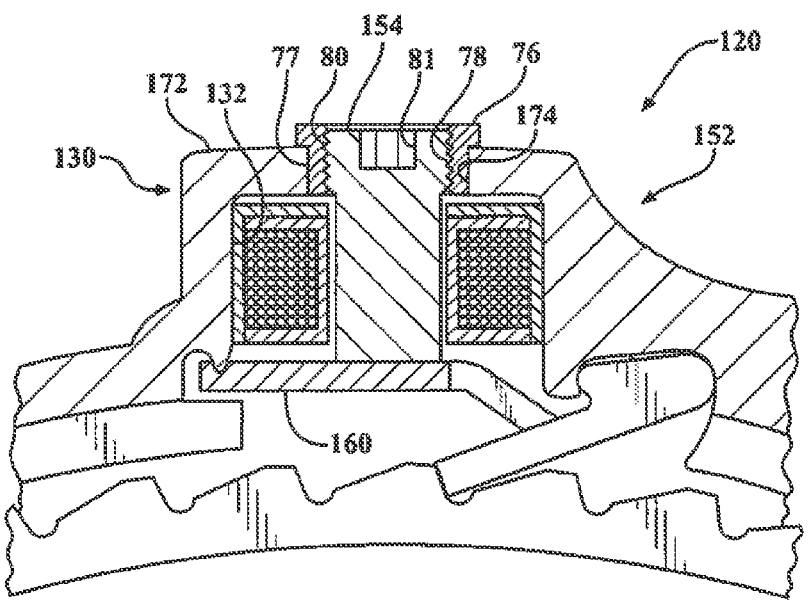
FIGS. 4A and 4B similar views to FIGS. 3A and 3B showing an electromagnetic actuator constructed in accordance with another aspect of the present disclosure.
Figure 4B:
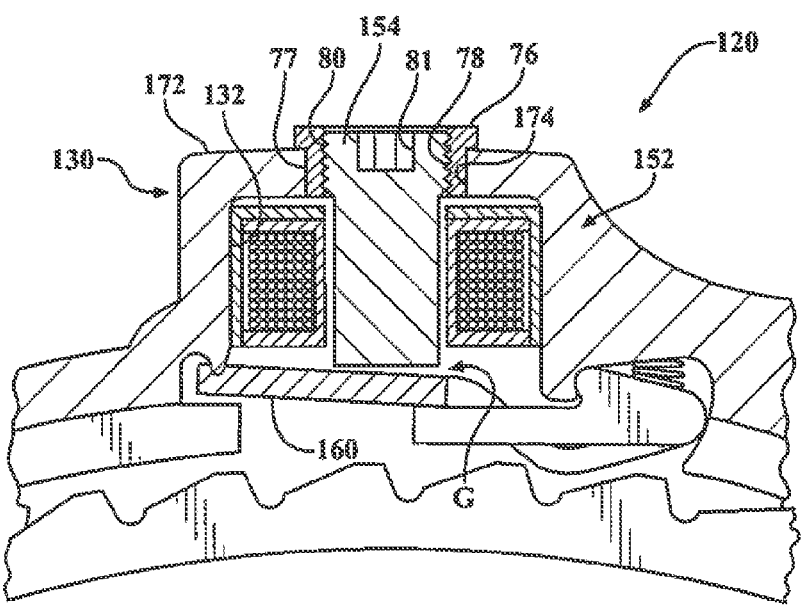

Referring to FIGS. 4A-4B, another example embodiment of a portion of a clutch assembly 120, similar to that discussed above with regard to FIGS. 3, 3A and 3B, is shown, wherein the same reference numerals, offset by a factor of 100, are used to identify like features. The coil assembly 152 is axially disposed and press fit into the respective actuator pockets 132, as discussed above; however, rather than directly fixing and press fitting the core 154 into an orifice 174 in an outer wall 172 of the protrusion 130, the core 154 is operably fixed in the orifice 174 in the outer wall 172 via a hollow adaptor plug, also referred to as nut 76. The nut 76 is first fixed in the orifice 174 of the protrusion, and then, the core 154 is disposed through the nut 76 and fixed thereto, whereupon the core 154 is readily adjusted to provide the desired gap G between the free end of the core 154 and the armature 160. The nut 76 is provided having an outer surface 77 configured for fixation within the orifice 174, such as via at least one of press fit, bonding agent, weld joint, threaded engagement, or other suitable mechanical and/or adhesion fixation mechanism. The nut 76 further includes a threaded through passage 78 configured for threaded engagement with an externally threaded portion 80 of the core 154, shown as a threaded fastener end portion 80. To facilitate threading the core 154 into the nut 76, the fastener end portion 80 can be provided with a tool receptacle pocket 81, wherein the pocket 81 can be configured for engagement with any standard tool drive feature, as is known in the art of fasteners. When threading the core 154 into engagement with the nut 76, the gap G between the free end of the core 154 and the armature 160 can be precisely set, as desired, such as by threading the free end of the core 154 into abutment with the armature 160, and then reverse threading and backing the core 154 radially away from the armature 160 a set distance, which can be readily derived by knowing the pitch angle of the threads on the nut 76 and core 154, by way of example and without limitation. Upon fixing the core 154 in position, the core 154 can remain free from direct attachment with the coil 158 and bobbin 156, and thus, is disposed in a clearance fit therewith, which in turn allows for readily simple adjustment and replacement of the core 154 as desired without effect on either the coil 158 or bobbin 156.

Figure 5:
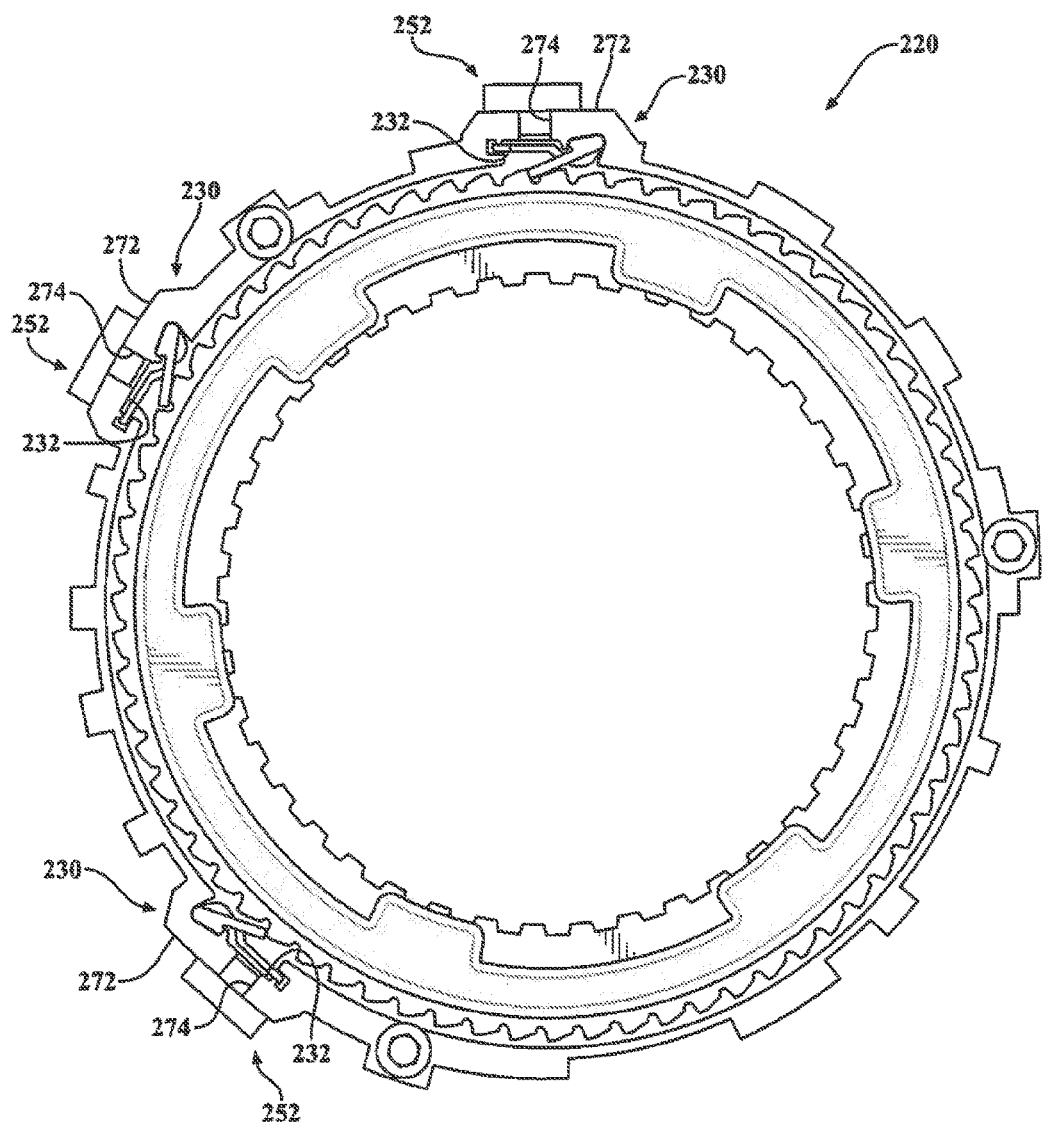
FIG. 5 illustrates a clutch assembly having a selectable one-way clutch with a press-fit electromagnetic actuator associated with the active strut assembly in accordance with another aspect of the present disclosure.
Figure 5A:
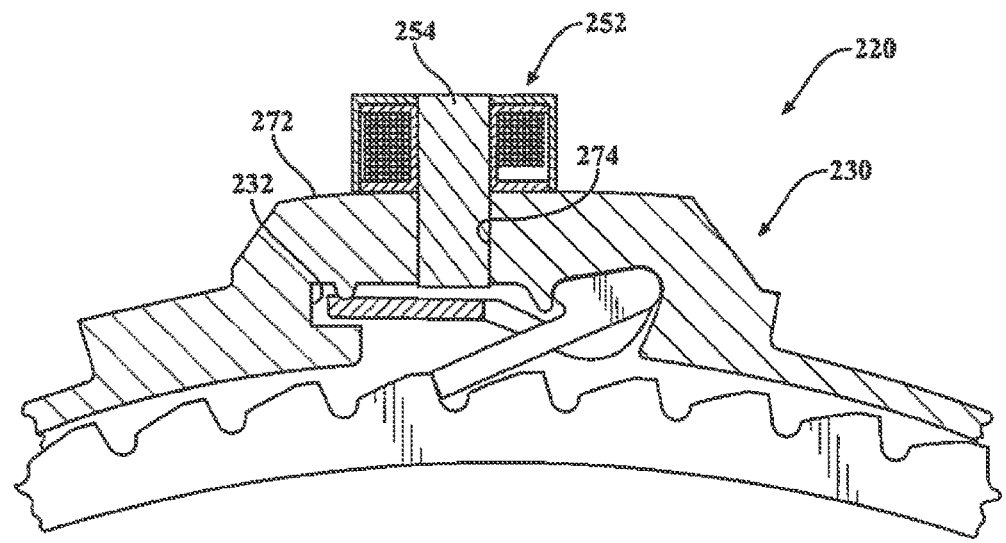
FIG. 5A is an enlarged partial cross-sectional view of FIG. 5 illustrating an orifice formed in the outer race housing configured to receive the radially pressed electromagnetic actuator in accordance with one aspect of the present disclosure.
Figure 5B:
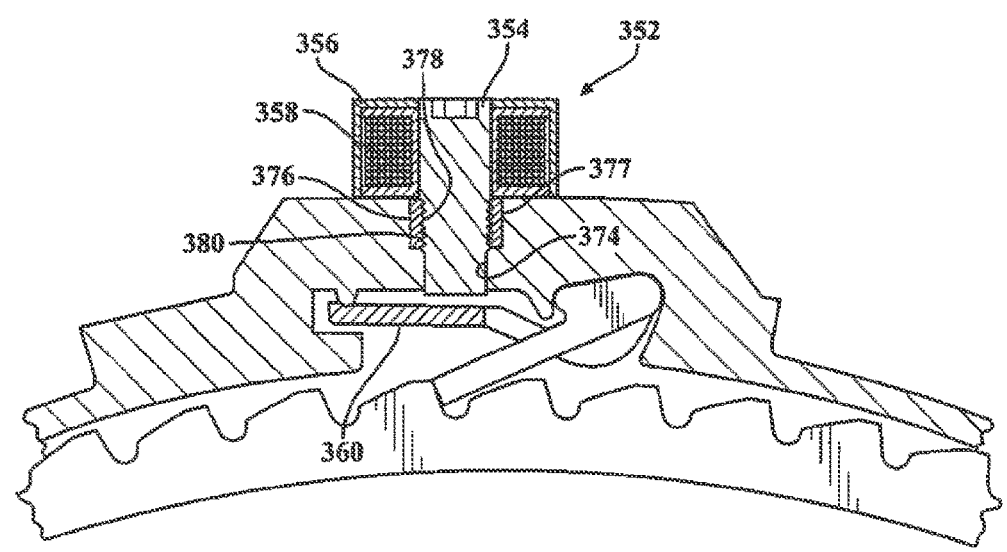
FIG. 5B is a view similar to FIG. 5A showing an electromagnetic actuator assembled to the outer race housing in accordance with another aspect of the present disclosure.

Referring to FIGS. 5 and 5A, another example embodiment of a clutch assembly 220 is shown, wherein the same reference numerals, offset by a factor of 200, are used to identify like features. In this embodiment, an orifice 274 extends directly through the outer wall 272 of the protrusion 230 to the actuator pocket 232, wherein the orifice 274 is configured to receive the core 254 of the coil assembly 252 radially therein. The core 254 of the coil assembly 252 is pressed radially inwardly into the orifice 274 and fixed therein. As a result of the core 254 being fixed in the orifice 274, the entire coil assembly 252 is fixed in place without having access an inner portion of the protrusion 230. In the embodiment shown, the core 254 is sized for a press fit, also known as an interference fit, within the orifice 274, wherein it should be recognized that other mechanisms for fixing the core 254 in the orifice 274, other than press fit, are contemplated herein, such as discussed above with reference to adhesives, weld joints, mechanical fasteners and the like. Further, as shown in FIG. 5B, another example embodiment, similar to that discussed above with regard to FIGS. 4A and 4B, is shown, wherein the same reference numerals, offset by a factor of 300, are used to identify like features. Rather than fixing the core 354 in direct contact with the orifice 374 in the outer wall 372, a nut 376 can be used to facilitate fixing the core 354 of the coil assembly 352 in a precise setting relative to the armature 360, thereby establishing a precise gap G therebetween, as desired. The nut 376 is provided having an outer surface 377 configured for fixation within the orifice 374, such as via at least one of press fit, bonding agent, weld joint, threaded engagement, or other suitable mechanical and/or adhesion fixation mechanism. The nut 376 further includes a threaded through passage 378 configured for threaded engagement with an externally threaded portion 380 of the core 354, shown as a portion immediately adjacent the radially outwardly extending bobbin 356 and coil 358. When threading the core 354 into engagement with the nut 376, the gap G between the free end of the core 354 and the armature 360 can be precisely set, as discussed above with regard to FIGS. 4A and 4B. Upon fixing the core 354 within the nut 376, it is to be recognized that other than the core 354, the remaining portion of the coil assembly 352 remains external to the protrusion 312, and thus, can be freely accessed when desired, such that servicing the coil assembly 352 is made easy.

Figure 7:
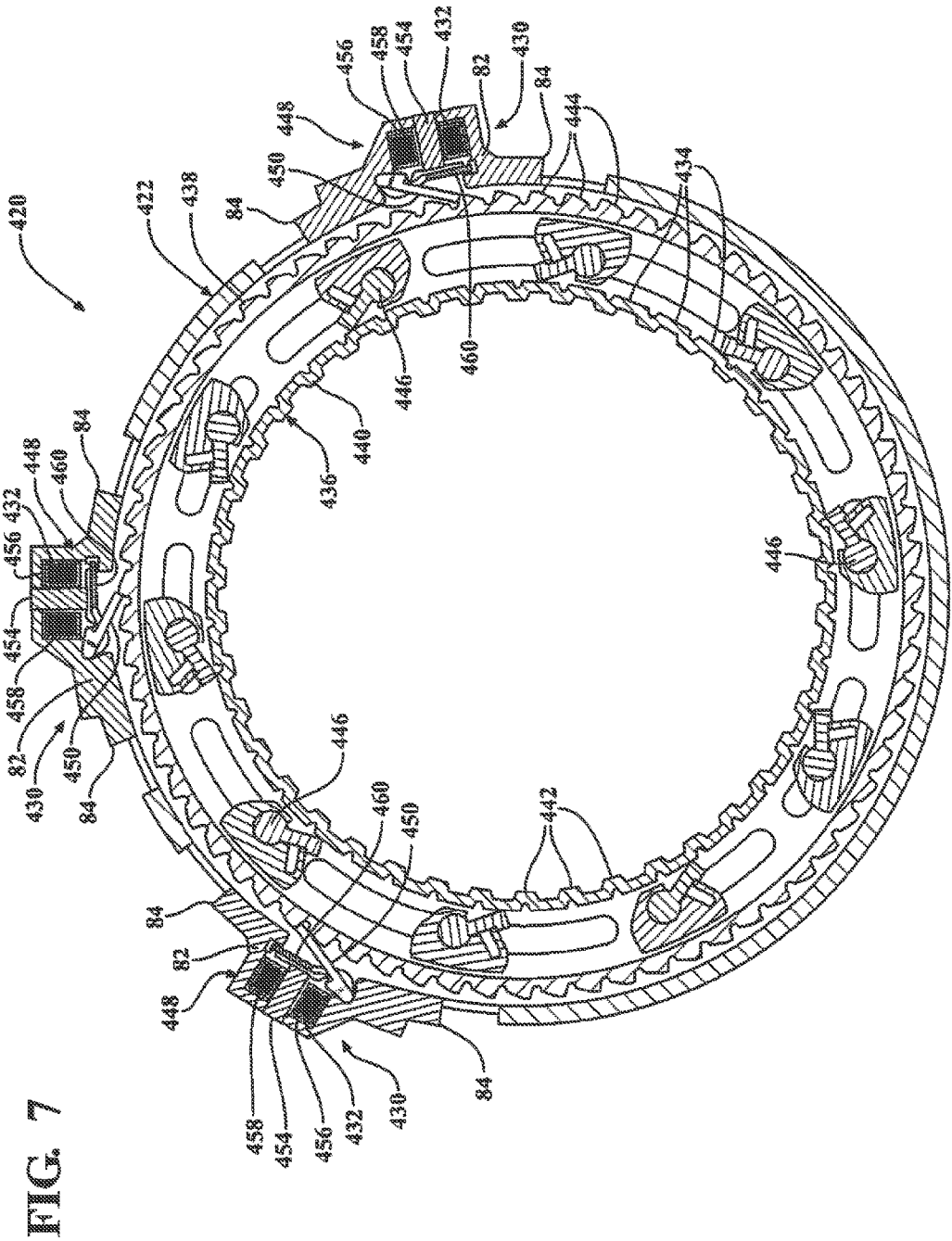
FIG. 7 is a cross-sectional side view of the bi-directional clutch assembly shown in FIG. 6.

Referring to FIGS. 6 and 7, wherein like numerals indicate corresponding parts throughout the several views, offset by a factor of 400, a clutch assembly 420 is generally shown. The clutch assembly 420 includes an outer race 422 that extends annularly about an axis A. The outer race 422 includes an outer ring 424 that presents a plurality of outer lugs 428 that extend radially outwardly for mating with a first component The first component can be a stationary component (such as a housing of a transmission) or a rotary component (such as a shaft). The outer race 422 further has an axially facing web or face 427 that has an annular shape that extends radially inwardly from the outer ring 424. A plurality of passive struts 446 are pivotally connected to the axial face 427. A biasing spring (not shown) engages each of the passive struts 446 for biasing the passive struts 446 in a locked position toward an inner race 436.

The inner race 436 extends annularly about the axis A. The inner race 436 has an outside rim or band 438 and an inside rim or band 440 that are spaced radially from one another on opposing sides of the passive struts 446. The inside band 440 of the inner race 436 presents a plurality of inner lugs 442 that extend radially inwardly therefrom for mating with a second component (typically a rotary component). The inside band 440 of the inner race 436 further presents a plurality of passive teeth 434 that extend radially outwardly therefrom for being engaged by the passive struts 446 for locking the inner and outer races 436, 422 to one another in response to counter-clockwise rotation of the inner race 436 relative to the outer race 422. The outside band 438 of the inner race 436 presents a plurality of active teeth 444 that extend radially outwardly therefrom and are evenly distributed about the axis A.

A plurality of active strut assemblies 448 are axially connected to the outer race 422. Each of the active strut assemblies 448 includes a generally arc shaped protrusion 430, wherein the protrusion 430 is constructed as separate piece of material from the outer race 422. Each protrusion 430 includes a base 82 and a pair of circumferentially extending flanges 84 that extend from the base 82 on opposing sides of the base 82. A fastener 85, e.g., a bolt, extends axially through a through opening in each of the flanges 84 and is fastened to the outer race 422 for securing the active strut assemblies 448 to the outer race 422. The active strut assemblies 448 are arranged n circumferential alignment with one another about the axis A, as desired.

An actuator pocket 432 extends axially into the base 82 of each of the active strut assemblies 448. A coil assembly 452 is disposed in each of the actuator pockets 431 The coil assembly 452 includes a core 454 of a magnetically permeable material, a bobbin 456 configured for receipt about the core 454, and a coil 458 wrapped about the bobbin 456. It should be appreciated that the bobbins 456 and coils 458 of the coil assemblies 452 can advantageously be easily fitted into their respective pockets 432 for easy installation.

Each of the active strut assemblies 448 includes an active strut 450 that is selectively pivotal between a locked and an unlocked position, as discussed above. In the locked position, the active struts 450 engage the active teeth 444 of the inner race 436, therefore locking the outer and inner races 422, 436 to one another during clockwise movement of the inner race 436 relative to the outer race 422. However, the active struts 450 allow relative displacement, i.e., overrun, in the counter-clockwise direction. In the unlocked position, the active struts 450 are radially spaced from the active teeth 444, allowing the outer and inner races 422, 436 to rotate relative to one another.

The plurality of passive struts 446 are pivotal between a locking position and an unlocking position. In the locking position, the passive struts 446 engage the passive teeth 434 of the outer race 422 for connecting the outer and inner races 422, 436 to one another during counter-clockwise rotation of the inner race 436 relative to the outer race 422. Therefore, engagement by the passive struts 446 prevents relative displacement of the outer and inner races 422, 436 in the counter-clockwise direction, however, the passive struts 446 allow relative displacement, i.e., overrun, in the clockwise direction. In the unlocking position, the passive struts 446 are radially space from the passive teeth 434 of the outer race 422, thereby allowing counter-clockwise rotation of the inner race 436 relative to the outer race 422.

Each of the active strut assemblies 448 further includes an armature 460 disposed between the active strut 450 and the core 454 for providing the pivotal movement of the active strut 450 in response to energization of the coil 458. A lead frame 462, such as discussed above with regard to FIGS. 1 and 2, electrically connects the coils 458 to one another for energizing the coils 458 to actuate and pivot the active struts 450 to their engaged, locked positions.

Accordingly, it should be appreciated that the modular configuration of the active strut assemblies/coil assemblies 448, 452 allows the active strut assemblies/coil assemblies 448, 452 to be manufactured separately from the rest of the clutch assembly 420. Further, it should be appreciated that any number of the active strut assemblies/coil assemblies 448, 452 could be installed on any given clutch assembly 420 as needed to provide a needed amount of torque. Additionally, it should be appreciated that the modular active strut assemblies as described herein could be utilized on various other clutch assembly configurations.

It should be appreciated that being able to axially or radially load the coil assemblies 52, 152, 252, 352, 452 discussed above provides for a simple manufacturing assembly step and allows the coil assembly 52, 152, 252, 352, 452 to be assembled before being installed into the respective actuator pocket 32, 132, 232, 332, 432. It should further be appreciated that the aforementioned axially and radially loading pockets/protrusions could be utilized on other clutch assembly configurations.

Figure 8:
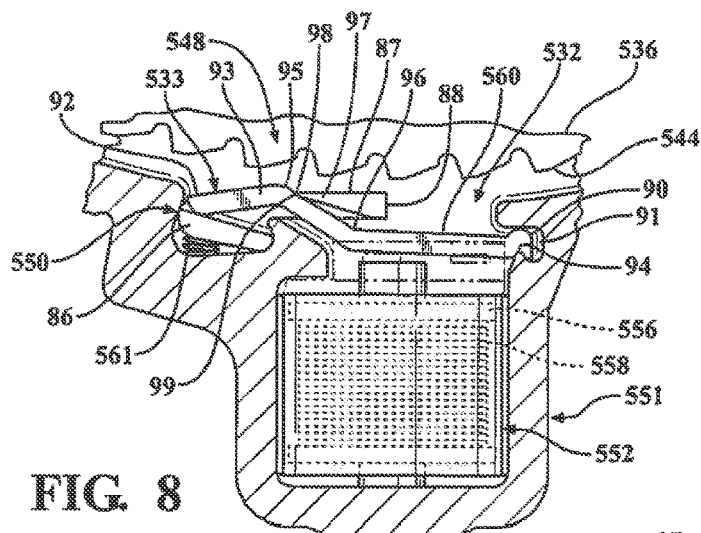
FIG. 8 is an enlarged partial side view of an active strut assembly adopted for use with the selectable one-way clutch associated with the bi-directional clutch assemblies of FIG. 1 and configured to provide a high inertia load resistance arrangement in accordance with the present disclosure and illustrating the active strut in an unlocked position when an electromagnetic actuator is non-energized.
Figure 9:
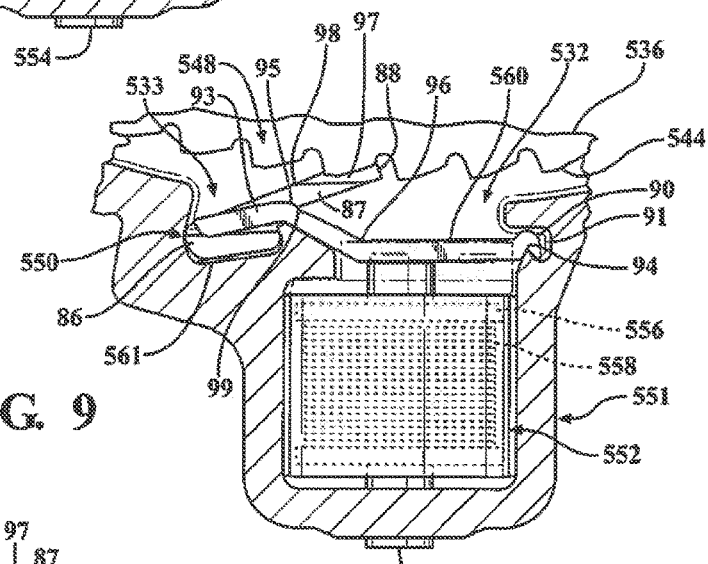
FIG. 9 is similar to FIG. 8 illustrating the active strut located in a locked position in response to energization of the electromagnetic actuator.
Figure 10:
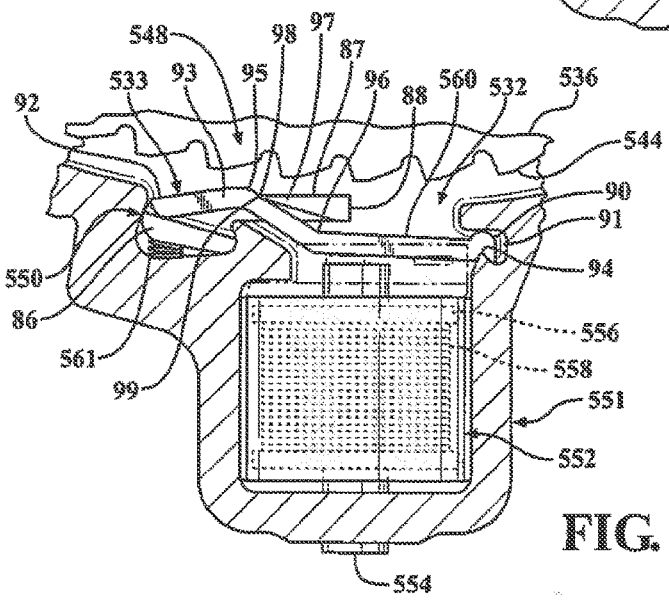
FIG. 10 is similar to FIG. 8 illustrating the inertia load resistance arrangement positively holding the active strut in its unlocked position upon application of a radially directed high inertial load.

Referring to FIGS. 8-10, wherein like numerals indicate corresponding parts throughout the several views, offset by a factor of 500, an active strut assembly 548, which can be incorporated in any of the clutch assembly embodiments discussed herein, as well as others, as will be readily apparent to one skilled in the art, is received in a strut pocket 533 of the outer race 522. Each of the active strut assemblies 548 is operable via actuation of an electromagnetic actuator 551 having a coil assembly 552, an armature 560, a biasing spring 561, and an active strut 550.

The active strut 550 includes a base segment 86 and a locking arm 87. The locking arm 87 extends from the base segment 86 to a locking end or edge 88. The base segment 86 is pivotally disposed in the strut pocket 533 for pivoting movement between a locked position (FIG. 9) and an unlocked position (FIGS. 8 and 10). In the locked position, the locking edge 88 engages the outer ratchet teeth 544 of the inner race 536, and in the unlocked position, the locking edges 88 are radially spaced from the outer ratchet teeth 544 of the inner race 536. The biasing spring 561 is disposed in the strut pocket 533 and extends between the base segment 86 and a base or floor of the strut pocket 533 for biasing the strut 550 toward the unlocked position.

The coil assembly 552 includes a core 554 of a magnetically permeable material that is disposed through a central passage of a bobbin 556, with at least one coil 558 being wrapped directly onto the bobbin 556, and thus, operably about the core 554 for focusing the magnetic flux produced by the coil 558 about the core 554.

The armature 560 extends between a first end 90 that is seated in an armature section 91 of the actuator pocket 532 for pivotal movement therein and a second end 92 that extends into the strut pocket 533 into engagement with the base 86 of the strut 550. The armature 560 is shown as having bifurcated legs 93 forming a channel therebetween, wherein the channel is sized for clearance receipt of a reduced width section of the strut 550 therein, with each leg 93 extends along opposite sides of the strut 550. The first end 90 of the armature 560 is pivotally disposed about a pivot rail 94 in the armature section 91 of the pocket 532 for pivoting radially toward and away from the core 554, in response to energization of the coil 558, between an actuated position and a non-actuated position. In the actuated position, the armature 560 is drawn toward the core 554, whereupon the legs 93 drive the strut 550 into the locked position via engagement with the base segment 86. In the non-actuated position, the armature 560 is spaced from the core 554 and allows the biasing spring 561 to bias the strut 550 into the unlocked position. The armature 560 presents an upper bend 95 in each leg 92 and a lower bend 96 adjacent an attachment region of the legs 92, such that the upper and lower bends 95, 96 are between the first end 90 and the second end 92.

It is important, especially when the clutch assembly 520 is utilized on automotive components, for the struts 550 to only engage the outer ratchet teeth 544 of the inner race 536 when then coil assembly 552 is energized to intentionally move the struts 550 to the locked position. Therefore, resistance to inertia loading (high g-force in certain directions other than simple gravity) is important for the operation of the clutch assembly 520. The most common method of resisting high inertia loading is to utilize a higher force biasing spring 561. While this method is a quick fix, there are disadvantages associated therewith. One of the disadvantages is the increased resistance provided by the biasing spring 561 during normal operation, which requires the armature 560 and/or coil assembly 552 to be increased in size and thickness to produce the necessary increased magnetic forces to overcome the increase in spring force imparted by the larger spring 561. To accommodate such larger components, the pockets 532, 533 may also need to be larger, thereby increasing the overall size and weight of the clutch assembly 520.

As an alternative solution to increasing the size of the aforementioned components/assemblies, the generally central portion of the strut 550 that extends between the legs 93 of the armature 560 includes a projections 97 that have a generally triangular shaped cross-section that extends lengthwise along a portion of the locking arm 87, with the projections 97 extending outwardly from the central portion of the locking arm 87 away from one another into overlying relation with a respective leg 93. Each of the projections 97 converges and terminates at a generally sharp edge 98. Further, a shoulder 99 is defined by or provided adjacent the upper bend 95 in the legs 92 of the armature 560. The shoulders 99 are configured to be engaged by the edges 98 of the projections 97 of the strut 550 for restricting the strut 550 against movement toward the locked direction, unless otherwise actuated via energization of the coil assembly 552. Thus, during the application of inertial forces, the purposeful engagement of the projections 97 with the shoulders 99 causes the strut 550 to stop rotating upwardly, thereby preventing engagement of the outer ratchet teeth 544 of the inner race 536 with the locking edge 88 of the strut 550 (as best shown in FIG. 10).

FIG. 8 presents a non-energized position of the coil 558, with the strut 550 in the unlocked position. Further, FIG. 9 presents an energized position of the coil 558, causing the strut 550 to be pivoted to the locked position, as intended.

FIG. 10 shows the situation in which a high inertial load is applied to the clutch assembly 520 in the radial inward direction (as shown by the arrow). In this situation the armature 560 rotates clockwise slightly under the inertial load, however, the strut 550 is blocked and prevented from rotating counter-clockwise any further due to the intentional interference established between the abutting shoulder 99 of the armature 560 and the locking edges 98 of the projections 97. Therefore, the interference between the edges 88 of the projections 97 and the shoulders 99 of the armature 560 greatly increase the force required to move the strut 550 against the outer ratchet teeth 544 of the inner race 536, but doesn't increase the amount of load required by the armature 560/coil assembly 552 to pivot the strut 550, as commanded and intended.

It should be appreciated that the projections 97 of the struts 550 and shoulders 99 of the armature 560 could be utilized on other active strut assembly configurations to resist high inertia loading.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed:

1. A bi-directional clutch assembly, comprising:
an outer housing having an outer race presenting a plurality of inner ratchet teeth;
an inner race presenting a plurality of outer ratchet teeth;
a passive one-way clutch including a plurality of passive struts pivotally supported for locked engagement with said inner ratchet teeth during rotation of said inner race in a first direction relative to said outer race;
a selectable one-way clutch including at least one active strut selectively pivotal from an unlocked position wherein said active strut is disengaged from said outer ratchet teeth to a locked position for engaging one of said plurality of outer ratchet teeth during rotation of said inner race in a second direction opposite said first direction;
a protrusion extending radially outwardly from said outer housing, said protrusion having an outer wall with an orifice extending therethrough; and
a coil assembly having a bobbin, a coil wrapped about said bobbin, and an elongate core extending through a through passage of said bobbin, said elongate core being operably fixed in said orifice to be selectively magnetized by said coil to move said at least one active strut to said locked position and to be selectively demagnetized to allow said at least one active strut to move to said unlocked position.

2. The bi-directional clutch assembly of claim 1 wherein said elongate core is press fit in said orifice.

3. The bi-directional clutch assembly of claim 2 wherein said elongate core extends through said through passage of said bobbin in a clearance fit.

4. The bi-directional clutch assembly of claim 3 wherein said protrusion is fixed to said outer race as a separate piece of material.

5. The bi-directional clutch assembly of claim 2 wherein said elongate core is press fit in said through passage of said bobbin.

6. The bi-directional clutch assembly of claim 5 wherein said bobbin and said coil extend radially outwardly from said protrusion.

7. The bi-directional clutch assembly of claim 1 further comprising a nut fixed in said orifice, said nut has a threaded through passage and said core is threaded in fixed relation in said threaded through passage.

8. The bi-directional clutch assembly of claim 7 wherein said elongate core extends through said through passage of said bobbin in a clearance fit.

9. The bi-directional clutch assembly of claim 8 wherein said protrusion has a pocket facing radially inwardly from said outer wall, said bobbin and said coil being disposed in said pocket.

10. The bi-directional clutch assembly of claim 7 wherein said bobbin and said coil extend radially outwardly from said protrusion.

11. The bi-directional clutch assembly of claim 10 wherein said elongate core extends through said through passage of said bobbin in a press fit.

12. The bi-directional clutch assembly of claim 1 wherein said protrusion has an actuator pocket facing radially inwardly from said outer wall, said bobbin and said coil being disposed in said actuator pocket.

13. The bi-directional clutch assembly of claim 12 wherein said actuator pocket has an open side surface, said bobbin and said coil being axially disposed into said actuator pocket through said open side surface.

14. The bi-directional clutch assembly of claim 13 wherein said bobbin is press fit in said actuator pocket.

15. The bi-directional clutch assembly of claim 12 wherein said protrusion has a strut pocket facing radially inwardly from said outer wall, said strut pocket being separate from said actuator pocket, said active strut being disposed in said strut pocket.

16. The bi-directional clutch assembly of claim 15 further comprising an armature disposed between said active strut and said core, said armature being pivotal in response to said core being magnetized to pivot said active strut into said locked position.

17. The bi-directional clutch assembly of claim 16 wherein a preset gap is established between a free end of said core and said armature when said core is selectively demagnetized.

18. The bi-directional clutch assembly of claim 17 wherein said core is press fit in said orifice to establish said preset gap.

19. The bi-directional clutch assembly of claim 17 further comprising a nut fixed in said orifice, said core is threaded in said nut to establish said preset gap.

* * * * *